United States Patent
Seal et al.

(10) Patent No.: US 8,402,455 B2
(45) Date of Patent: Mar. 19, 2013

(54) METHODS AND SYSTEMS FOR DISTRIBUTING FIRMWARE THROUGH AN OVER-THE-AIR NETWORK

(75) Inventors: Brian Keith Seal, Powell, TN (US); John Bettendorff, San Francisco, CA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 1157 days.

(21) Appl. No.: 12/049,711

(22) Filed: Mar. 17, 2008

(65) Prior Publication Data
US 2009/0235246 A1 Sep. 17, 2009

(51) Int. Cl.
*G06F 9/44* (2006.01)
*G06F 9/445* (2006.01)

(52) U.S. Cl. .................. 717/173; 717/171; 717/177

(58) Field of Classification Search .............. 717/168, 717/172
See application file for complete search history.

(56) References Cited

U.S. PATENT DOCUMENTS

| | | | | |
|---|---|---|---|---|
| 8,250,564 B2* | 8/2012 | Bando et al. | ............ | 717/171 |
| 8,250,565 B2* | 8/2012 | Marolia et al. | ............ | 717/173 |
| 2003/0030842 A1* | 2/2003 | Suyehira | ............ | 358/1.15 |
| 2004/0117788 A1* | 6/2004 | Karaoguz et al. | ............ | 717/177 |
| 2004/0210894 A1* | 10/2004 | Zarco | ............ | 717/171 |
| 2005/0257215 A1* | 11/2005 | Denby et al. | ............ | 717/172 |
| 2006/0048144 A1* | 3/2006 | Willess et al. | ............ | 717/177 |
| 2007/0103303 A1* | 5/2007 | Shoarinejad | ............ | 340/572.1 |
| 2007/0169106 A1* | 7/2007 | Douglas et al. | ............ | 717/173 |
| 2007/0250830 A1* | 10/2007 | Holmberg et al. | ............ | 717/171 |
| 2008/0092132 A1* | 4/2008 | Stuber et al. | ............ | 717/173 |
| 2008/0134165 A1* | 6/2008 | Anderson et al. | ............ | 717/173 |
| 2008/0168435 A1* | 7/2008 | Tupman et al. | ............ | 717/173 |
| 2008/0186871 A1* | 8/2008 | Trevino et al. | ............ | 370/252 |
| 2008/0216066 A1* | 9/2008 | Oh | ............ | 717/173 |
| 2009/0031299 A1* | 1/2009 | Karstens | ............ | 717/177 |

OTHER PUBLICATIONS

Vishwas Mudagal, Methods for Upgrading Reconfigurable Hardware Used in Mobile Phones, White Paper, Freescale Semiconductor, Inc, 2006, pp. 2-11.*
Yair Amir, Fast Handoff for Seamless Wireless Mesh Networks, 2006, pp. 2-6.*
Ian F. Akyildiz, Wireless mesh networks: a survey, Computer Networks, 2004, pp. 448-458.*

* cited by examiner

*Primary Examiner* — Thuy Dao
*Assistant Examiner* — Mongbao Nguyen
(74) *Attorney, Agent, or Firm* — Kilpatrick Townsend & Stockton LLP

(57) ABSTRACT

Systems and methods for over-the-air firmware distribution to battery-powered devices are disclosed. Such over-the-air distribution is accomplished, for example, using a non-battery-powered device as a buffer, for example, to reduce or eliminate the delay time of the over-the-air network. The firmware can be sent to and stored on a nearby, non-battery-powered device and then sent from there to the battery-powered endpoint device. The distribution of firmware to battery-powered devices may be implemented in an Advanced Metering Infrastructure (AMI) system, a mesh network, a multi-channel radio network, or any other environment in which firmware distribution is desirable.

22 Claims, 3 Drawing Sheets

METHODS AND SYSTEMS FOR DISTRIBUTING FIRMWARE THROUGH AN OVER-THE-AIR NETWORK

TECHNICAL FIELD

This disclosure relates generally to distributing firmware, including methods and systems of distributing firmware to battery-powered devices used in Advanced Metering Infrastructure (AMI) systems, among other environments.

BACKGROUND

Radio communication-based networks are widespread and used for a variety of applications. Such networks are commonly employed in AMI systems that measure, collect, and/or analyze utility usage from electricity, gas, water, and other meters through various communication media. Network node devices and/or endpoint devices of such systems typically include firmware. Over-the-air download of firmware is generally only feasible for non-battery-powered devices. Sending firmware to battery-powered devices has required that such devices stay "awake" for an extended period of time, for example, while packets are exchanged between the device and a firmware providing host. Staying awake, with transmission hardware draining the battery, for these extended periods of time uses a significant portion of the battery's life and makes such techniques unfeasible.

SUMMARY OF THE INVENTION

Systems and methods for over-the-air firmware distribution to battery-powered devices are disclosed. Such over-the-air distribution is accomplished, for example, using a non-battery-powered device located closer to the battery-powered device. For example, to minimize the burden on the network access points and reduce or eliminate the delay time of the over-the-air network, the firmware can be sent to and stored on a nearby non-battery-powered device and then sent from there to the battery-powered endpoint device. The distribution of firmware to battery-powered devices may be implemented as part of an AMI system, a mesh network, a multi-channel radio network, or in any other environment in which firmware distribution is desirable.

These embodiments are mentioned to provide examples and aid understanding. Additional embodiments and advantages are also discussed in the Detailed Description and will become readily apparent to those skilled in the art. As will be realized, the invention is capable of other and different embodiments, and its several details are not essential, but rather are capable of modifications in various obvious respects, all without departing from the invention. Accordingly, the drawings and description are to be regarded as illustrative in nature, and not as restrictive.

BRIEF DESCRIPTION OF THE FIGURES

The above described and other features, aspects, and advantages of the present disclosure are better understood when the following Detailed Description is read with reference to the accompanying drawings, wherein.

DETAILED DESCRIPTION

Figure 1:
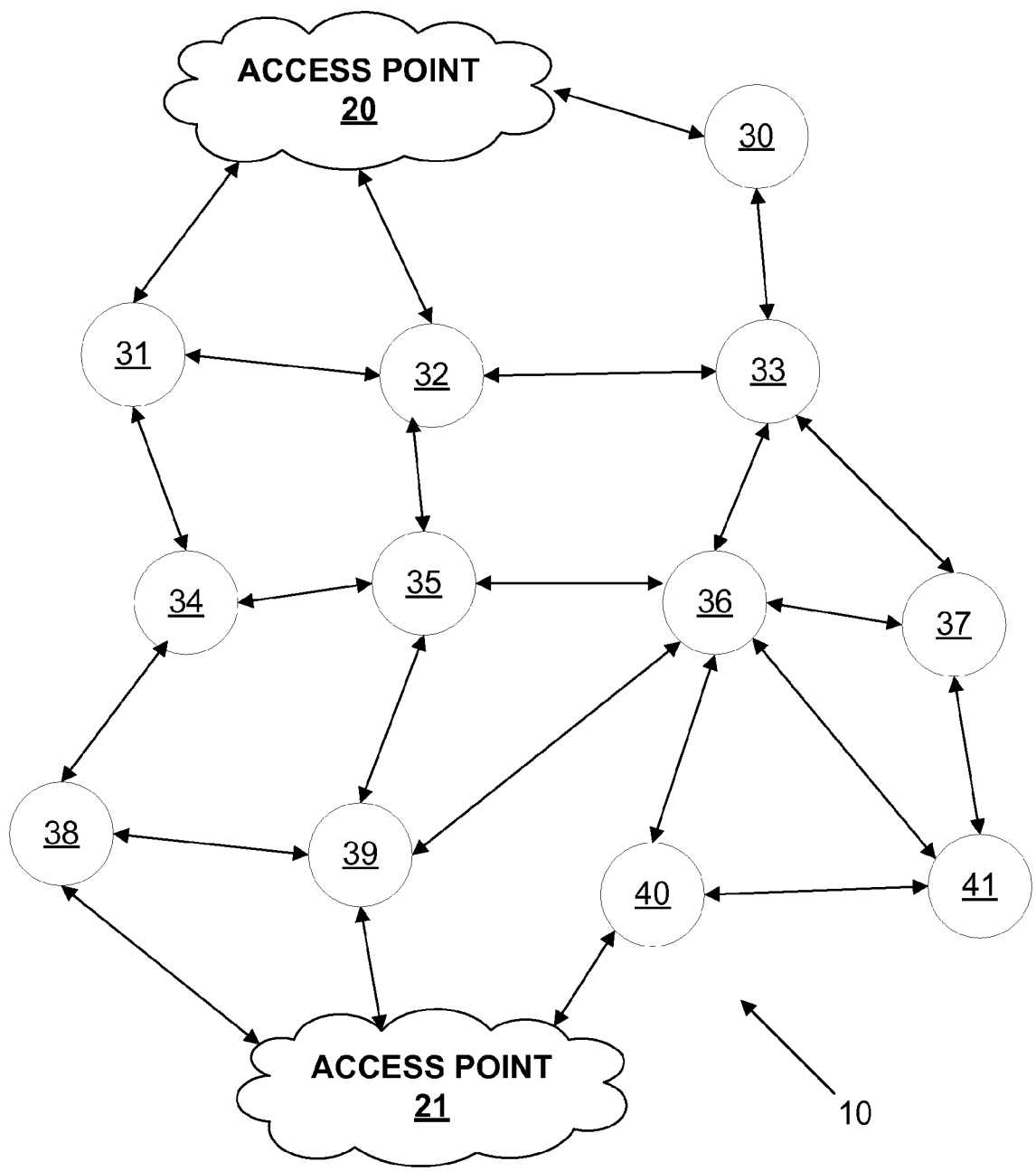
FIG. 1 is a system diagram illustrating an exemplary network environment.

FIG. 1 is a system diagram illustrating an exemplary network environment. Other embodiments may be utilized. The network 10 shown in FIG. 1 comprises access points 20, 21 and other devices, referred to herein as network node devices 30-41. The network node devices 30-41 work together to create a mesh network in which each network node device generally comprises a radio that can speak to and respond to neighboring radio devices of neighboring network node devices. Each network node devices may comprise or connect to an endpoint device such as a utility meter or appliance, or may not itself comprise or connect to an endpoint device. Thus, a network node device may interact with an endpoint device, act as part of the network, or both, and may do so simultaneously. The radio of each network node devices may have a programmable logic controller (PLC)—like device. Such a device can enable the radio to function like a small computer, carrying out appropriate computing and command functions. Thus, intelligence in some or all of the radios may be used to delegate and distribute commands throughout the network 10. The radio may, but need not necessarily, allow two-way communication.

As an example of a utility monitoring network, each network node device of network 10 that comprises or connects to an endpoint may collect information about utility consumption at that endpoint and send such information through the network 10 to an access point 20, 21, where it may be collected by a utility company, for example, for billing and/or monitoring purposes. As a more specific example, an endpoint device radio may generate a packet of data that is transmitted to some destination, such as an access point destination. The packet may be addressed to the destination and entered into the network. The data packet traverses the network by hopping from radio to radio (network node device to network node device) in the direction of the destination-addressed radio. The route chosen for traversing the network may be dynamic and/or may employ automatic rerouting in the event a particular data path is not clear. Generally, the network 10 will attempt to minimize the number of hops to increase transmission speed. The radio and/or other components at a network node device/endpoint device may be battery-powered, line-powered, or powered by any other suitable power source and attached via any suitable connection.

Figure 2A:
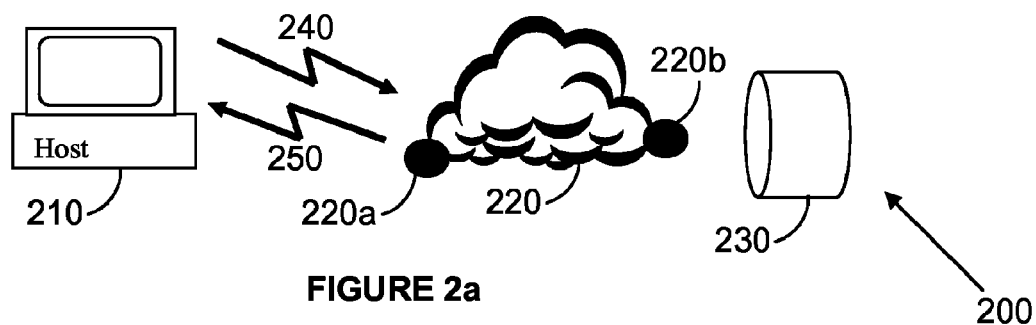
FIGS. 2a-b are system diagrams illustrating exemplary communication of firmware to a battery-powered device.
Figure 2B:
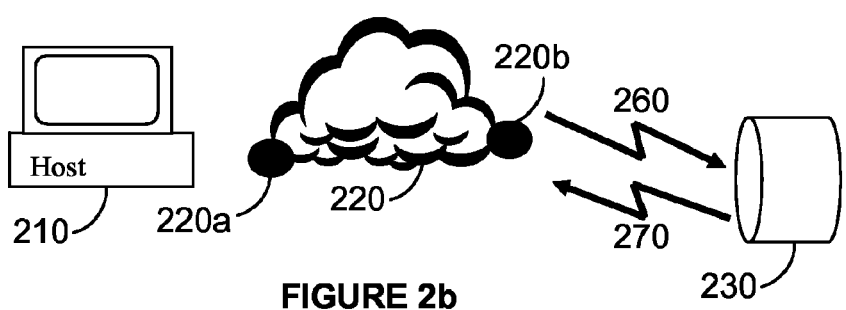

FIGS. 2a-b are flow diagrams illustrating exemplary communication of firmware to a battery-powered device 230. Each of the network node devices 220a, 220b, 230 of the network 220 may have a storage area for the device's main code and additional download space providing a buffer memory area. In the example depicted in FIGS. 2a-2b, a non-battery-powered device 220b of the system 200 is used to assist a battery-powered device 230 with firmware upgrades. The non-battery-powered device 220b has a memory space allocated for holding its own firmware upgrades as they are downloaded over the network 220 from a host 210. That memory space of the non-battery-powered device 220b is also used to store new firmware that is ultimately sent to the battery-powered device 230.

The non-battery-powered network node devices 220b may be selected to assist with the firmware download based on its network proximity to the battery-powered device 230. For example, the non-battery-powered device 220b may be, but need not be, adjacent to or the nearest neighbor to the battery-powered device 230. The non-battery-powered device may be a device that communicates directly with the battery-powered devices for other purposes, e.g., to communicate consumption data in a consumption data collection system. Node 220b, once it has received a full copy of the battery-node's firmware, may provide the firmware to multiple battery-nodes. A non-battery-powered device can service one to any number of battery-powered devices by direct node-to-node communication, through some form of broadcast, or otherwise. The number of non-battery-powered devices used to distribute the firmware may depend on the specific network. For example, if the network consists of electric meters, non-battery-powered devices may be very common and, in many cases, quite close to a battery powered device. As another example, if the network involved only water utility meters, then the number of non-battery devices might be relatively small. In certain embodiments, the download of firmware (for a battery-powered device) to a non-battery-powered device may not involve going all the way back to the host. For example, the system may have the capability of commanding a node in the network to go and get a copy of code from another node (presumably nearby) without going all the way back to the host.

In FIG. 2a, a firmware providing host 210 sends the firmware in one or more communications 240 into the network 220. The firmware is stored on a non-battery-powered network node device 220b. In response to each communication 240, the non-battery-powered network node device 220b may send an acknowledgement 250 through the network 220 and back to the host 210. In this example, the host utilized an access network node device 220a to access the network 220. However, a host or other firmware providing device may access the network in any suitable manner and/or may itself be considered a part of the network 220. During the potentially lengthy time that the firmware is traversing the network 220 and being compiled in the non-battery-powered network node device 220b, the battery-powered network node device will generally remain asleep, i.e., having its radio receiver powered down or otherwise not in a state of readiness to receive a transmission.

In FIG. 2b, the non-battery-powered network node device 220b sends the firmware in one or more communications 260 to the battery-powered network node device 230. In response to each communication 260, the battery-powered network node device 230 may send an acknowledgement 270 back to the non-battery-powered network node device 220b. The communications 260 and acknowledgements 270 may be directly between the network node devices 220b, 230 or may involve additional network node devices. Once the firmware is completely downloaded to the battery-powered device 230, the device 230 may be made aware of and begin using it the next time the device 230 wakes up.

A battery-powered node device is, in general, aware that a firmware download is in-process, because such a high quantity of communication is abnormal for it. It will have special memory spaces for the code currently executing, and the new code being downloaded. If the process gets interrupted for any reason (like a power outage in the powered-part of the network) the process may be resumed where it left off.

A non-battery-powered node device may make a battery-powered node device aware that it has firmware available and the battery-powered node device may then determine whether it wants or needs the firmware. For example, a battery-powered node device may already have the current firmware image and determine to decline the offered firmware download. At the conclusion of a download, a battery-powered node device may send a message to the firmware providing host indicating it is now running newer firmware.

Because the firmware is locally stored in a network node device 220b that is in close or direct communication with the battery-powered device 230, the firmware can be quickly copied, greatly reducing the associated battery power consumption and making viable the download of firmware to the battery-powered device 230, where it might otherwise be unfeasible to do so. This may still involve splitting the code into two pieces and downloading it from the host in two steps, buffering the code at the neighbor for fast transfer to the end node in larger pieces.

The download to the battery-powered device 230 may be initiated in a variety of ways. For example, a battery-powered node device may be programmed to wake and listen at intervals between regular data transmission. During these listen periods, the device can be informed if there is something that requires their attention, such as a new firmware download or portion thereof. As another example, a battery-powered node device may be awoken with a wake-up signal from a host or other network node. An example of a wake-up signal is a strong, brief RF tone on a known frequency received by an ultra-low powered tuned-circuit that is always active to pick up the signal and wake the processor.

The download to the battery-powered device 230 may be initiated after a transmission from the battery-powered device 230. For example, if the battery-powered device 230 is an endpoint metering device in an AMI system, the endpoint device may periodically transmit commodity consumption information collected at the endpoint. Transmission hardware at an endpoint device, such as a radio receiver, may stay awake after such a transmission waiting for an acknowledgement of receipt. A device component may be considered "awake" when it is receiving power from a battery or non-battery power source and is capable of receiving a transmission, and "asleep" when it is powered down or otherwise not in a state of readiness to receive a transmission.

In the case where a firmware download is desired for an endpoint device, an acknowledgement may tell the transmission components at the endpoint device to stay awake, so that a firmware download from an adjacent or nearby network node devices can begin. Whether the transmission portion of a device is awake or asleep generally will not interfere with the endpoint device's other functions, for example, monitoring consumption of a commodity.

As an alternative to two-way streaming and other download techniques, consumption information transmission acknowledgements may themselves be used to provide the firmware. For example, the firmware could be provided within a series of acknowledgement transmissions, e.g., acknowledging receipt of consumption data at a nearby network node device. This nearby network node device, in addition to receiving the buffered data and sending it on through the network, may also buffer firmware to be downloaded to the battery-powered network node. Each acknowledgement transmission may carry a small portion of the firmware to the battery-powered network node.

Figure 3:
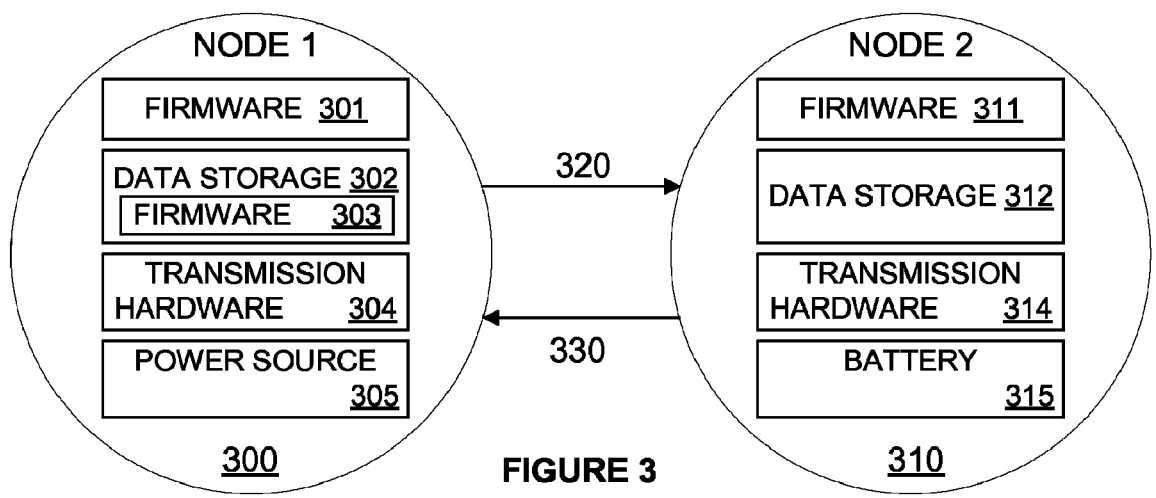
FIG. 3 is a system diagram illustrating firmware download from a non-battery-powered network node devices to a battery-powered network node device.

FIG. 3 is a system diagram illustrating firmware download from a non-battery-powered network node device 300 to a battery-powered network node device 310. The non-battery-powered network node devices 300 comprises firmware 301, a data storage area 302, transmission hardware 304, and a non-battery power source 305. The battery-powered network node device 310 comprises firmware 311, a data storage area 312, transmission hardware 314, and a battery power source 315. The data storage area 302 of the non-battery-powered network node device 300 may be used as a buffer to store firmware 303 intended for the battery-powered network node device 310.

The firmware 303 may be sent from the non-battery-powered network node device 300 to the battery-powered network node device 310 in one or more communications 320, each of which may or may not be acknowledged by an acknowledgment 330. The downloaded firmware 303 may be stored in the data storage area 312 of the battery-powered network node device 310 while the download occurs, may be transferred directly to replace the device's existing firmware 311, or downloaded in any other suitable manner. If downloaded to a data storage area 312, the downloaded firmware 303 will generally be transferred to replace the device's existing firmware 311.

Figure 4:
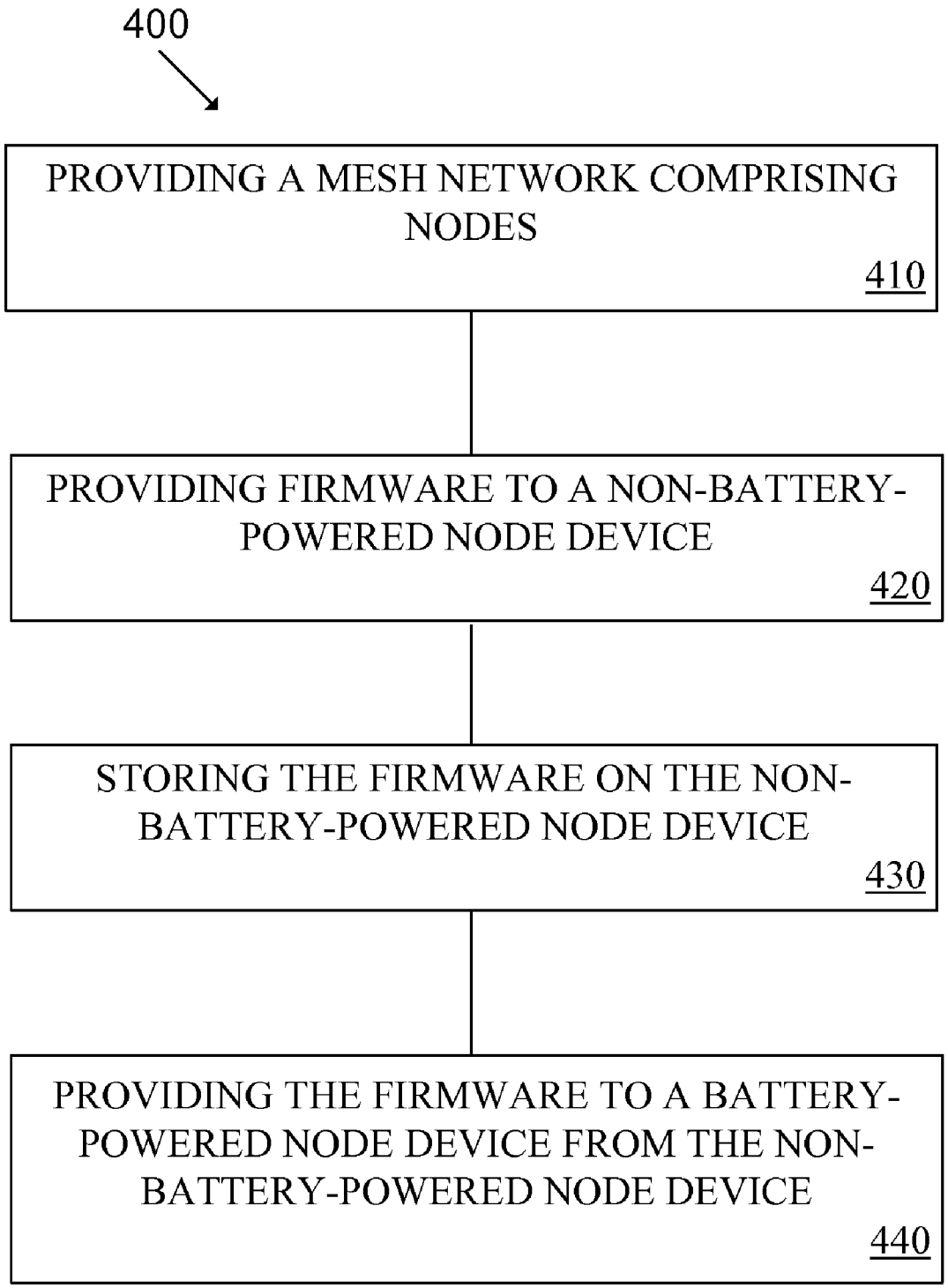
FIG. 4 is a flow diagram illustrating an exemplary method of providing firmware to a battery-powered network node device.

FIG. 4 is a flow diagram illustrating an exemplary method 400 of providing firmware to a battery-powered network node device. The method comprises providing a mesh network comprising network node devices, as shown in block 410. In some cases, at least some of the network node devices will be endpoint devices, such as endpoint devices of a commodity consumption collection network or AMI system.

The method 400 further comprises providing firmware to a non-battery-powered network node device of the mesh network. For example, a firmware-providing host may send the firmware to the non-battery-powered network node device. The host may select the non-battery-powered network node device as an appropriate device to assist in providing firmware to battery-powered device. As another example, the non-battery-powered device may recognize that a battery-powered device with which it communicates is in need of a firmware upgrade and request the updated firmware from a firmware source. Other techniques for identifying battery-powered devices in need of firmware and non-battery-powered devices usable to assist in downloading may be used.

The method 400 further comprises storing the firmware on the non-battery-powered network node device in a memory. For example, the non-battery-powered device may have a data storage memory area that it uses to buffer its own firmware downloads. This buffer area may be used to store the firmware that is to be provided to the battery-powered network node device.

The method 400 further comprises providing the firmware to a battery-powered network node device of the mesh network from the memory of the non-battery-powered network node device. This may involve downloading the firmware in a single session in which the battery-operated network node device remains awake or may involve discrete sessions in which a portion of firmware is received. For example, in a consumption data collection system, consumption information transmission acknowledgements may be used to provide segments of the firmware.

One embodiment of the present disclosure is a method that involves providing a mesh network of network node devices and storing firmware in a memory of a non-battery-powered network node device. The method involves providing a first portion of the firmware in a first transmission to a battery-powered network node device from the memory of the non-battery-powered network node device. The method further involves providing a second portion of the firmware in a second transmission to the battery-powered network node device from the memory of the non-battery-powered network node device. The transmissions may be acknowledgement transmissions of received data such as commodity consumption data. The method may further involve configuring a transmission component of the battery-powered network node to send data to the non-battery-powered network node device and remain awake after sending data only while awaiting an acknowledgement. The transmission component of the battery-powered network node may be asleep for a period of time between a receipt of the first acknowledgement and a receipt of the second acknowledgement.

One embodiment of the present disclosure is a method that involves providing a mesh network comprising network node devices and configuring a transmission component of the battery-powered network node to send data to the non-battery-powered network node and remain awake after sending data only while awaiting acknowledgement of receipt of the data. The method may involve storing firmware in a memory of a non-battery-powered network node device of the mesh network and providing the firmware in a series of acknowledgement transmissions to the battery-powered network node device from the memory of the non-battery-powered network node device. Each of the acknowledgment transmissions acknowledges receipt of data from the battery-powered network node and comprising a portion of the firmware. The transmission component of the battery-powered network node may not be awake for a download time period over which the firmware is provided to the battery-powered network node and/or for a time period after each acknowledgement of the series of acknowledgements is received.

General

The foregoing description of the embodiments of the invention has been presented only for the purpose of illustration and description and is not intended to be exhaustive or to limit the invention to the precise forms disclosed. For example, the uses of firmware downloading and updating on battery-powered devices are numerous and not limited by the examples described herein. The techniques of the invention are not limited to AMI systems, mesh networks, or any other particular network configuration. Thus, in general, numerous modifications and adaptations are apparent to those skilled in the art without departing from the spirit and scope of the invention.

That which is claimed:

1. A method comprising:
providing a mesh network comprising network node devices;
providing firmware to a non-battery-powered network node device of the mesh network;
storing the firmware on the non-battery-powered network node device in a memory; and
providing the firmware to a battery-powered network node device of the mesh network from the memory of the non-battery-powered network node device, the battery-powered node comprising a battery and transmission hardware, wherein the battery-powered network node sends data to the non-battery-powered network node and remains awake after sending data only while awaiting an acknowledgement and is asleep without the transmission hardware draining the battery for at least a portion of the time that the firmware is provided to the non-battery-powered network node.

2. The method of claim 1 further comprising selecting the non-battery-powered network node device based on its network proximity to the battery-powered network node device.

3. The method of claim 1, wherein the firmware on the battery-powered network node device is different from firmware controlling the operation of the non-battery-powered network node device.

4. The method of claim 1, wherein the firmware on the battery-powered network node device is the same as firmware controlling the operation of the non-battery-powered network node device.

5. The method of claim 1, wherein at least some of the network node devices are endpoint devices.

6. The method of claim 5, wherein the endpoint devices collect commodity consumption-related data.

7. The method of claim 1, wherein the non-battery-powered network node device comprises transmission hardware powered by a non-battery power source.

8. The method of claim 1, wherein the system is an Advanced Metering Infrastructure (AMI) system.

9. A method comprising:
providing a mesh network comprising network node devices;
storing firmware in a memory of a non-battery-powered network node device of the mesh network, wherein a battery-powered node comprising a battery and transmission hardware was asleep without the transmission hardware draining the battery for at least a portion of the time that the firmware was provided to the non-battery-powered network node;
configuring a transmission component of the battery-powered network node to send data to the non-battery-powered network node and remain awake after sending data only while awaiting an acknowledgement;
providing a first portion of the firmware in a first transmission to the battery-powered network node device of the mesh network from the memory of the non-battery-powered network node device,
providing a second portion of the firmware in a second transmission to the battery-powered network node device of the mesh network from the memory of the non-battery-powered network node device.

10. The method of claim 9, wherein the first transmission is a first acknowledgement transmission and the second transmission is a second acknowledgement transmission.

11. The method of claim 9, wherein the data is commodity consumption or event data.

12. The method of claim 9, wherein the transmission component of the battery-powered network node is asleep for a period of time between a receipt of the first acknowledgement and a receipt of the second acknowledgement.

13. A method comprising:
providing a mesh network comprising network node devices;
configuring a transmission component of the battery-powered network node to send data to the non-battery-powered network node and remain awake after sending data only while awaiting acknowledgement of receipt of the data;
storing firmware in a memory of a non-battery-powered network node device of the mesh network; and
providing the firmware in a series of acknowledgement transmissions to the battery-powered network node device from the memory of the non-battery-powered network node device, each of the acknowledgment transmissions acknowledging receipt of data from the battery-powered network node and comprising a portion of the firmware;
wherein the transmission component of the battery-powered network node is not awake for a download time period over which the firmware is provided to the battery-powered network node.

14. The method of claim 13, wherein the transmission component of the battery-powered network node is not awake for a time period after each acknowledgement of the series of acknowledgements is received.

15. A system comprising:
a firmware-providing host for providing firmware to network node devices; and
a mesh network comprising network node devices;
wherein a battery-powered network node device of the mesh network comprises a battery, transmission hardware, and firmware downloaded from a non-battery-powered network node device to the battery-powered network node device, the firmware originating from the firmware-providing host and stored on the non-battery-powered network node device before download to the battery-powered network node device, wherein the battery-powered network node is configured to send data to the non-battery-powered network node and remain awake after sending data only while awaiting an acknowledgement and to be asleep without the transmission hardware draining the battery for at least a portion of the time that the firmware is downloaded from the firmware-providing host to the non-battery-powered network node.

16. The system of claim 15, wherein the firmware downloaded from the non-battery-powered network node device to the battery-powered network node device is different from firmware controlling the operation of the non-battery-powered network node device.

17. The system of claim 15, wherein the firmware downloaded from the non-battery-powered network node device to the battery-powered network node device is the same as firmware controlling the operation of the non-battery-powered network node device.

18. The system of claim 15, wherein at least some of the network node devices are endpoint devices.

19. The system of claim 18, wherein the endpoint devices collect commodity consumption-related or event data.

20. The system of claim 15, wherein the battery-powered network node device comprises two storage areas.

21. The system of claim 20, wherein the non-battery-powered network node device is capable of operating without interruption as new firmware is downloaded.

22. The system of claim 15, wherein the system is an Advanced Metering Infrastructure (AMI) system.

* * * * *